(12) United States Patent
Treier et al.

(10) Patent No.: US 8,366,798 B2
(45) Date of Patent: *Feb. 5, 2013

(54) FILTER AND METHOD OF MAKING

(75) Inventors: Philip P. Treier, Bloomdale, OH (US); Christopher R. Reamsnyder, Perrysburg, OH (US); Michael S. Lynch, Fostoria, OH (US)

(73) Assignee: Fram Group IP LLC, Lake Forest, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/225,970

(22) Filed: Sep. 6, 2011

(65) Prior Publication Data

US 2012/0060456 A1   Mar. 15, 2012

Related U.S. Application Data

(60) Continuation of application No. 12/876,571, filed on Sep. 7, 2010, now Pat. No. 8,012,232, which is a division of application No. 11/533,649, filed on Sep. 20, 2006, now Pat. No. 7,794,556.

(60) Provisional application No. 60/718,639, filed on Sep. 20, 2005.

(51) Int. Cl.
*B01D 46/52* (2006.01)

(52) U.S. Cl. .............. 55/498; 156/73.1; 55/520; 55/521

(58) Field of Classification Search ................. 156/73.1, 156/196, 199, 205, 210, 292; 428/59; 55/497, 55/498, 520, 521

See application file for complete search history.

(56) References Cited

U.S. PATENT DOCUMENTS

| | | | |
|---|---|---|---|
| 4,410,427 A | 10/1983 | Wydeven | |
| 4,589,983 A | 5/1986 | Wydevan | |
| 5,820,646 A | 10/1998 | Gillingham et al. | |
| 6,193,830 B1 | 2/2001 | Unrath | |
| 6,364,978 B1 | 4/2002 | Skov et al. | |
| 6,673,136 B2 | 1/2004 | Gillingham et al. | |

(Continued)

FOREIGN PATENT DOCUMENTS

| | | |
|---|---|---|
| EP | 703823 | 2/1954 |
| WO | 0112295 A1 | 2/2001 |

(Continued)

OTHER PUBLICATIONS

International Search Report dated Jan. 30, 2007 for International Application No. PCT/US2006/036596, International Filing date Sep. 20, 2006.

(Continued)

*Primary Examiner* — James Sells
(74) *Attorney, Agent, or Firm* — Barnes & Thornburg LLP

(57) ABSTRACT

A filter is disclosed herein, the filter having: a plurality of sheets of filter media, each sheet of filter media having an inlet end and an outlet end, wherein each of the plurality of sheets of filter media has a first layer of filtration media thermoformed to have a plurality of channels, the first layer having an upper surface and a lower surface; a second layer of filtration media sonically welded to a portion of to the first layer of filtration media after the first layer is formed with the plurality of channels, wherein at least one edge of the first layer is not sonically welded to at least one edge of the second layer, and wherein the sheet of filtration media has a plurality of fluid channels each having an inlet opening at the at least one edge of the first layer and the second layer and a sealed end at another end of the sheet; wherein each of the plurality of sheets of filter media are secured together by a strip of adhesive located between each upper surface of each first layer facing the second layer of another sheet of filter media stacked upon the upper surface of the first layer of the filtration media; and wherein each of the plurality of fluid channels are also in fluid communication with at least one other of the plurality of fluid channels through an opening located between the at least one edge of the first layer and the second layer and the sealed end.

7 Claims, 7 Drawing Sheets

U.S. PATENT DOCUMENTS 7,794,556 B2  9/2010  Treier et al.
8,012,232 B2 * 9/2011  Treier et al. .................. 55/498

FOREIGN PATENT DOCUMENTS

WO      03047722  A2   6/2003
WO   2004007054  A1   1/2004

OTHER PUBLICATIONS

Written Opinion of the International Searching Authority dated Jan. 30, 2007 for International Application No. PCT/US2006/036596, International Filing date Sep. 20, 2006.

\* cited by examiner

FILTER AND METHOD OF MAKING

CROSS REFERENCE TO RELATED APPLICATIONS

This application is a continuation application of U.S. Ser. No. 12/876,571 filed Sep. 7, 2010 now U.S. Pat. No. 8,012,232, which is a division of U.S. Ser. No. 11/533,649 filed Sep. 20, 2006 now U.S. Pat. No. 7,794,556, which claims the benefit of U.S. Provisional Patent Application No. 60/718,639 filed Sep. 20, 2005, the contents each of which are incorporated herein by reference thereto.

TECHNICAL FIELD

The present invention relates to a filter for a fluid and a method for making the same.

BACKGROUND

Air induction housing systems are continually being challenged to become smaller and unique in shape without loss of system performance. In particular and referring to vehicular applications, this is due in part to the reduction in available real estate in the engine compartment. As vehicle profiles are reduced and engine systems become more complex there is very little available space for the air induction system, which is a critical component of the engine. The air induction system in an internal combustion engine of a vehicle provides at least two important functions; providing a means for delivery of air into the combustion chambers of the engine and providing a means for filtering the air prior to its delivery to the combustion chambers. Due to its filtering function the filter itself needs to be replaced after an extended period of use thus, accessibility to the filter is also a requirement imposed upon the air induction system as well as the housing.

In some designs the air induction system is not designed until the engine design is completed thus, the designers of the air induction system are typically faced with the problem of providing a predetermined amount of airflow to the engine while also being presented with a limited or unique amount of space between the engine and the vehicle hood, front grill etc. Accordingly, the air induction housing typically has a unique configuration that is optimized for flow and space requirements, which may be contradictory to design requirements for the filter to be located with in the air induction system.

Furthermore, reducing the housing size and creating unique shapes limits the overall size of the filter capable of being disposed therein. Accordingly, and based upon conventional airflow technology, smaller filters typically result in less capacity thus, reduced performance.

Accordingly, it is desirable to provide a filter and method of manufacture wherein the filter is capable of providing increased capacity while also accommodating the reduced size and shape limits. Moreover, it is also desirable to provide a filter and method of manufacture wherein the filter is configured for use as an air filter, fluid filter, fuel filter, oil filter, coolant filter, etc.

SUMMARY OF THE INVENTION

A filter is disclosed herein, the filter having: a plurality of sheets of filter media, each sheet of filter media having an inlet end and an outlet end, wherein each of the plurality of sheets of filter media has a first layer of filtration media thermoformed to have a plurality of channels, the first layer having an upper surface and a lower surface; a second layer of filtration media sonically welded to a portion of to the first layer of filtration media after the first layer is formed with the plurality of channels, wherein at least one edge of the first layer is not sonically welded to at least one edge of the second layer, and wherein the sheet of filtration media has a plurality of fluid channels each having an inlet opening at the at least one edge of the first layer and the second layer and a sealed end at another end of the sheet; wherein each of the plurality of sheets of filter media are secured together by a strip of adhesive located between each upper surface of each first layer facing the second layer of another sheet of filter media stacked upon the upper surface of the first layer of the filtration media; and wherein each of the plurality of fluid channels are also in fluid communication with at least one other of the plurality of fluid channels through an opening located between the at least one edge of the first layer and the second layer and the sealed end.

In another embodiment, a filter formed by the following steps is provided. The steps including: forming a plurality of sheets of filter media, each sheet of filter media having an inlet end and an outlet end, wherein each of the plurality of sheets of filter media are formed by the steps of: thermoforming a first layer of filtration media to have a plurality of channels, the first layer having an upper surface and a lower surface; sonically welding a portion of a second layer of filtration media to the first layer of filtration media after the first layer is thermoformed to form the sheet of filtration media, wherein at least one edge of the first layer is not sonically welded to at least one edge of the second layer, wherein the sheet of filtration media has a plurality of fluid channels each having an inlet opening at the at least one edge of the first layer and the second layer and a sealed end at another end of the sheet; and securing the plurality of sheets together by applying a strip of adhesive between each upper surface of each first layer facing the second layer of another sheet of filter media stacked upon the upper surface of the first layer of the filtration media.

In still another exemplary embodiment, a filter formed by the following steps is provided. The steps including: thermoforming a first layer of filtration media to have a plurality of channels, the first layer having an upper surface and a lower surface; sonically welding only a portion of a second layer of filtration media to the first layer of filtration media to form a sheet of filtration media having a plurality of fluid channels defined in part by the plurality of channels, each of the plurality of fluid channels having an inlet opening at one end of the sheet that is defined by another portion of the first layer that is not sonically welded to the second layer of filtration media and a sealed end at another end of the sheet; applying a strip of adhesive to the upper surface of the first layer of filtration media; and securing the second layer to the upper surface of the first layer of filtration media by wrapping the sheet of media around itself.

In yet another exemplary embodiment, a filter formed by the following steps is provided. The steps including: forming a plurality of sheets of filter media, each sheet of filter media having an inlet end and an outlet end, wherein each of the plurality of sheets of filter media are formed by the steps of: thermoforming a first layer of filtration media to have a plurality of channels, the first layer of filtration media having an upper surface and a lower surface; ultrasonically welding only a portion of a second layer of filtration media to the first layer of filtration media to form the sheet of filtration media, the sheet of filtration media having a plurality of fluid channels defined in part by the plurality of channels in the first layer of filtration media and each of the plurality of fluid channels having an inlet opening at another portion of the second layer that is not ultrasonically welded to the second layer and a sealed end defined at the portion where the second layer is ultrasonically welded to the first layer and wherein the first layer of filtration media and the second layer of filtration media are disposed between one of a pair of geared rollers and a contact surface of a first welding horn and a second welding horn, the first welding horn providing welded portions of the plurality of fluid channels and the second welding horn providing the sealed end; and securing the plurality of sheets together by applying a strip of adhesive between each upper surface of each first layer facing the second layer of another sheet of filter media stacked upon the upper surface of the first layer of the filtration media.

The above-described and other features are appreciated and understood by those skilled in the art from the following detailed description, drawings, and appended claims.

DETAILED DESCRIPTION OF EXEMPLARY EMBODIMENTS

Figure 1:
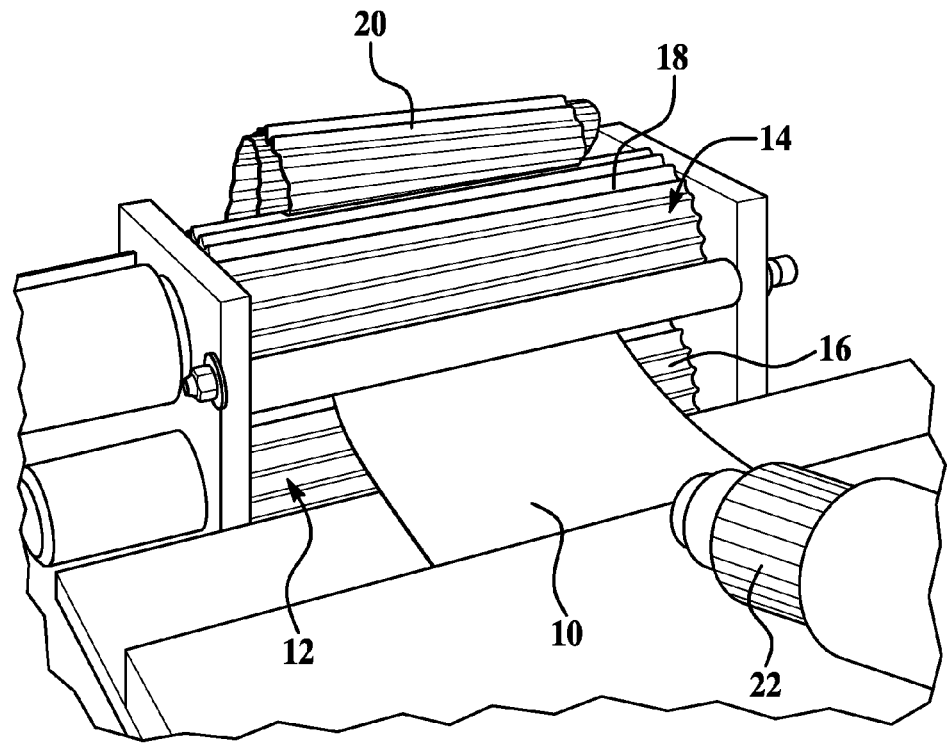
FIG. 1 is a perspective view of portions of a filter being constructed in accordance with exemplary embodiments of the present invention.

In accordance with exemplary embodiments of the present invention, a filter and method of making a filter is disclosed. In an exemplary embodiment the filter will be comprised of a plurality of layers of media each being formed by a pair of non-woven materials secured to each other wherein one of the non-woven materials is formed to have a plurality of corrugations and the other is a planar member welded to the layer having a plurality of corrugations and thereafter the two layers are secured to each other in order to provide a larger amount of filter surface area. In one embodiment, a plurality of these layers are secured to each other. In another embodiment, a single layer is wrapped around is wrapped around itself to provide the filter. In yet another exemplary embodiment, a single layer is wrapped around is wrapped around itself and other separate sheets are secured to the single layer wrapped around itself to provide the filter. In accordance with exemplary embodiments of the present invention a high capacity honeycomb style air filter is provided.

Reference is made to the following U.S. Pat. Nos. 6,673,136; 5,820,646; 4,410,427; and 4,589,983, the contents of which are incorporated herein by reference thereto.

Exemplary embodiments will provide an air filtration component that enables high contaminant capacity per packing volume available. Of course, it is understood that the filter may be used to filter other fluids such as but not limited to oils, fuels, coolants, liquids and other gases. In accordance with an exemplary embodiment, a non-woven media is used to provide a top or first sheet that is formed into a corrugated layer, and then the first sheet is attached to another flat sheet of the non-woven media and then this two sheet layer is used to form a filter, which provides a greater amount of media that can be fitted into a given packaging space thus giving a greater dust capacity of the filter, which in the aforementioned application is an air filter.

In one non-limiting exemplary embodiment the top sheet or first sheet containing the corrugations is formed to have the corrugations by a thermoforming process of a synthetic non-woven media. Alternatively, and if a cellulose based media is used, an embossing process could be used to form the corrugations and other means of sealing the two layers may be used other than sonic welding (e.g., adhesives, hot melt adhesives, etc.). Regardless of the material used and the process for forming the corrugations, the corrugations would be formed prior to the attachment of the lower or second flat sheet of media.

In one embodiment, the forming of the corrugations should be tapered gradually to pinch down to a flat portion on one side of the sheet to enable the attachment by welding of the lower flat sheet. In another exemplary embodiment, the attachment of the two sheets together along one peripheral edge will create the flat portion. In accordance with an exemplary embodiment, this end or peripheral edge will provide a portion of the exit end of the filter.

In accordance with exemplary embodiments of the present invention the two sheets can be bonded together along one edge portion using an adhesive or in an exemplary embodiment a continuous sonic weld. In one non-limiting exemplary embodiment, the sonic weld is provided by an ultrasonic welding horn configured to engage an end portion of the sheets of media.

Once the two sheets are attached together a long continuous roll of filter media comprising the two layers is formed. In one exemplary embodiment the continuous roll of media can be wrapped around itself in a spiral pattern to form a filter media. During this wrapping process, a bead of adhesive will be applied on the edge opposite the flat edge (e.g., exit side) of the two layers in order to secure the layers to each other as well as provide a sealing means in order to provide a plurality of fluid paths wherein fluid passing therethrough is filtered by the media having an inlet end and an outlet end, wherein fluid flow from the inlet end to the outlet end is filtered by the media. By having alternative ends of the corrugations on each subsequent layer sealed, a flow path is created which utilizes the entire media area. In accordance with an exemplary embodiment, the final shape of the media could be round, elliptical, oval or any number of the regular configurations.

In another exemplary embodiment, the continuous sheet or roll of media is cut into a plurality of sheets, which are stacked and secured to each other to provide the filter media. In any of the aforementioned embodiments, the media whether stacked, rolled, or any combination thereof is configured to be received within a filter housing (e.g., air, oil, fuel, coolant, water, liquids, etc.) wherein the filter has an inlet end and in outlet end wherein fluid flow is filtered by the media by flowing through the same by passing through into the inlet end and out the outlet end.

Referring now to FIG. 1 a flat sheet or first layer of non-woven media 10 is shown being inserted between two geared rollers 12 and 14. Each of the geared rollers have a plurality of teeth 16, 18 configured to form a plurality of channels 20 in sheet 10 as it is passed between geared rollers 12 and 14. In accordance with an exemplary embodiment non-woven media 10 is commercially available from Hollingsworth & Vose as BW3, a 3 oz/yd$^2$ polyester non-woven media. In addition, other non-woven medias from Hollingsworth & Vose were used including—BW4 (4 oz) and 7322 (high loft) media. Of course, other alternative materials are contemplated for use in exemplary embodiments one non-limiting example is a cellulose based media or other synthetic media.

In accordance with an exemplary embodiment, sheet 10 is heated prior to it being inserted between each of the geared rollers. In one non-limiting exemplary embodiment the sheet is heated by a heat gun 22. Thus, a thermoforming process is used to form the plurality of channels as sheet 10 passes between geared rollers 12 and 14. Of course, other equivalent methods for heating sheet 10 are contemplated in accordance with exemplary embodiments of the present invention. One non-limiting example would be to provide a source of heat directly to one or both of the geared rollers. For example, an electric heater could be disposed in either or both of the geared rollers.

Figure 2:
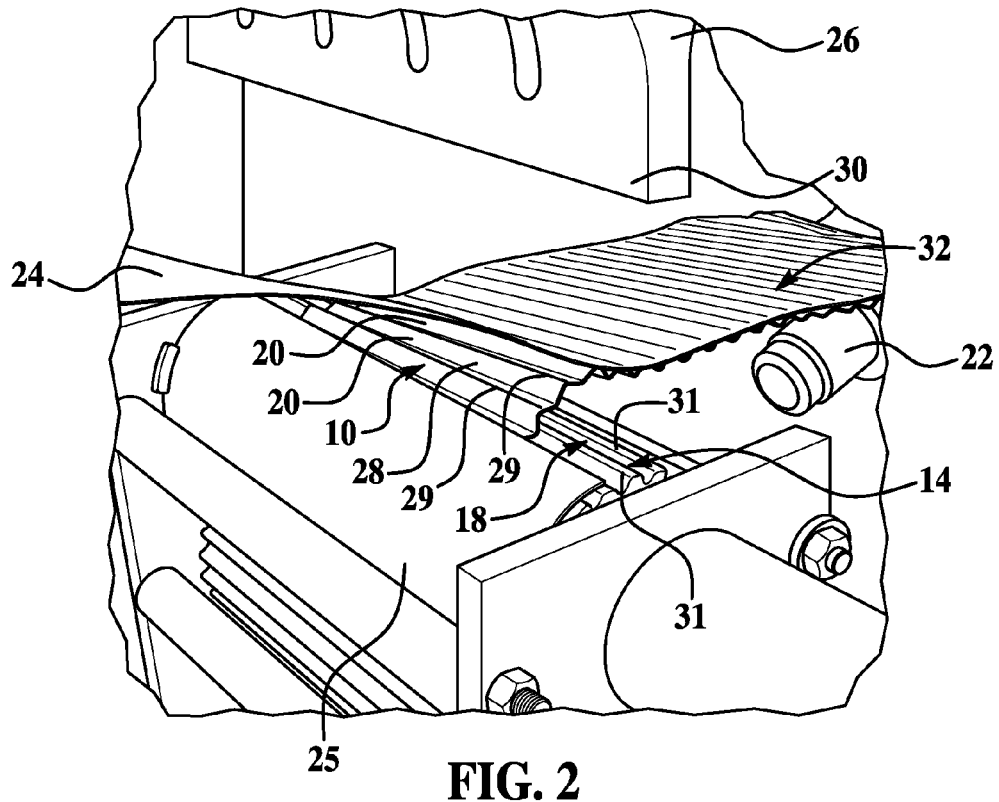
FIGS. 2 and 3 are perspective views illustrating construction of a filter in accordance with an exemplary embodiment of the present invention.
Figure 3:
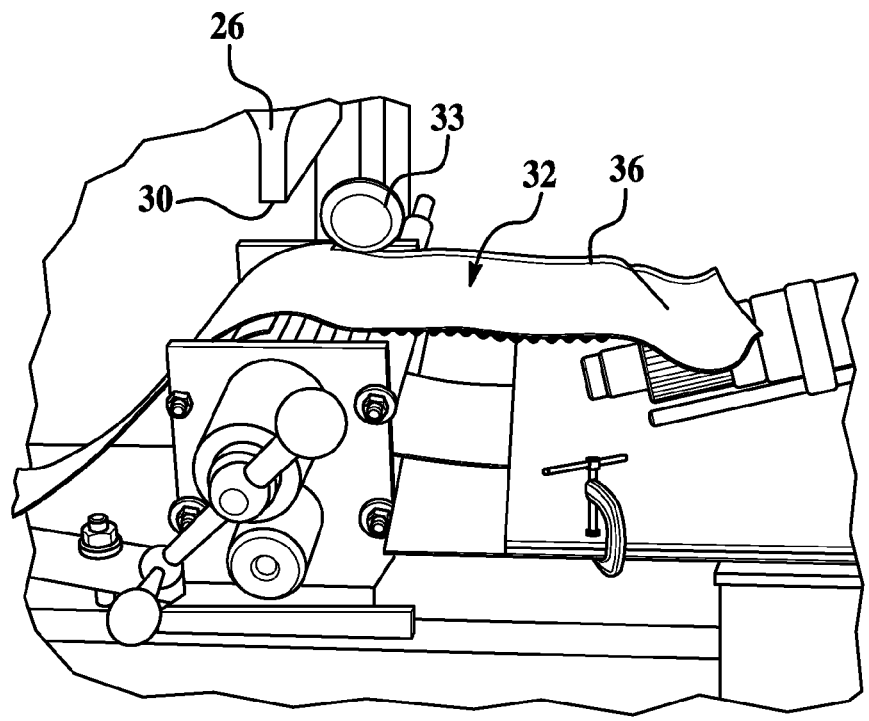

Referring now to FIGS. 1-3, the method of securing a second layer 24 of non-woven media to first layer 10 is illustrated. As illustrated, the first layer is formed between rolls 12 and 14 and then a shield 25 directs first layer 24 to travel in a direction opposite to the inlet direction (e.g., the direction the first layer is inserted between rolls 12 and 14. In accordance with an exemplary embodiment shield 25 is disposed in a facing spaced relationship with gear 14 to redirect layer 10 after it has passed through the two rollers. Thus, and after layer 10 is redirected a lower surface of layer 10 is now inverted to be facing layer 24 as it is passed onto layer 10.

In accordance with an exemplary embodiment and after layer 10 is redirected by shield 25, layer 10 is secured to layer 24 by an ultrasonic welding process. As is known in the related arts ultrasonic welding is a process wherein two items (e.g., plastic, metal, etc.) are joined together seamlessly through high-frequency acoustic vibrations where one component to be welded is placed upon a fixed anvil and the second component being placed on top and an extension ("horn") connected to a transducer is lowered down onto the top component, and a very rapid (~20,000 KHz), low-amplitude acoustic vibration is applied to the welding zone. The acoustic energy is converted into heat energy by friction, and the parts are welded together in less than a second.

In accordance with an exemplary embodiment a sonic welding horn 26 is lowered down onto second layer 24 and sonically welds a lower surface 28 of channels 20 to second layer 24 by compressing layers 10 and 24 between a contact surface 30 of welding horn 26 and a contact surface 31 of the gears of roller 14. As used herein "lower surface" of layer 10 is intended to mean the surface that is facing downwardly when layer 10 is inserted between rollers 12 and 14 and thereafter is facing upwardly towards layer 24 when layer 10 is redirected by shield 25. In other words, the edges of each of the corrugations or channels formed by the forming process on surface 28 are now secured to a surface of layer 24. For example, and if the channels are formed to have a triangular configuration the peak or valley 29 (depending on the orientation of the layer) is secured via an ultrasonic weld to a portion of layer 24. This point of securement is identified by reference numeral 29. Moreover, contact surface 31 provides for one of the surfaces for welding of peak 29 to a portion of layer 24, the other surface being surface 30 of horn 26. Of course, it is understood that the channels may have any other configuration and exemplary embodiments of the present invention are not limited to triangular configurations. Other non-limiting configurations include curves, trapezoids rectangles, arcs etc.

In accordance with an exemplary embodiment, contact surface 31 of the teeth of roller 14 provides the contact surface the welding horn is able to sandwich and secure portions of layers 10 and 24 to each other in order to provide the fluid conduits of the sheet of the filter media.

In accordance with an exemplary embodiment and referring now to FIGS. 1-3 and 10-11 and in order to provide a sealed exit end of the sheet of media a peripheral edge portion of the two layers is sealed together by an ultrasonic welding method wherein another ultrasonic welding horn 33 is positioned to sandwich a portion of layers 10 and 24 between the teeth of geared roller 14.

In order to provide the sealed end a surface of the ultrasonic horn 33 is configured to mesh with the teeth or gears of roller 12 to seal the peripheral edge of the two layers together as well as pinch down the channels of sheet 10.

In an alternative exemplary embodiment, sheet 10 is secured to sheet 24 via an adhesive or a combination of an adhesive and the ultrasonic welding process.

Referring now to FIGS. 1-6 and once first layer 10 is secured to second layer 24, a sheet of filter media 32 is formed with a plurality of channels each having an inlet flow opening or openings, which is formed by the openings of each of the channels formed by layer 10 and 24 to provide an inlet end 34 and a closed or outlet end 36. The closed end is also formed by sonically welding the two layers together. In one exemplary embodiment, surface 31 of the gears of roller 14 provide a surface for securing the two layers together to provide the closed or outlet end 36.

In accordance with one non-limiting exemplary embodiment, the forming of the corrugations or channels formed by the geared rollers is tapered to gradually to pinch down to a flat portion on one side of the sheet. In one exemplary embodiment, this is achieved by positioning a welding horn at the end of the rollers see FIGS. 10 and 11 such that at one end of media the corrugations or channels are sealed off (exit end of the filter) and at the opposite end (e.g., the end that will become the inlet end of the filter) the corrugations or channels are open. One non-limiting example of such a device for achieving this configuration is illustrated in FIG. 10. The two sheets can be bonded together on one edge using an adhesive or in an exemplary embodiment a continuous sonic weld. In addition, the entire length of the channels are also secured or welded to the second sheet so as to form the filtration channels illustrated in FIGS. 4-9.

Figure 19:
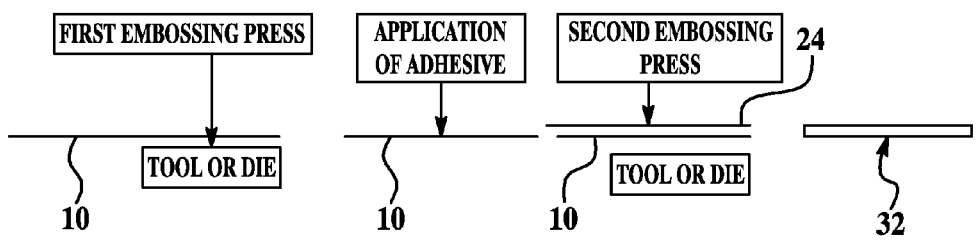
FIG. 19 is a schematic illustration of an alternative exemplary embodiment of the present invention.

In an alternative embodiment, and if a cellulose based media is used, an embossing process is used to form the corrugations and other means of sealing the two layers may be used other than sonic welding (e.g., adhesives, hot melt adhesives, etc.). In this embodiment the first layer is disposed between a press and die (illustrated schematically in FIG. 19) wherein the press and die have complimentary features similar to those of geared rollers 12 and 14 to form the channels. Thereafter, another press is used to seal layer 24 thereto using an adhesive and pressing process wherein the other press is configured to sandwich media 10 and 24 between the two sheets. At this step heat, if necessary, can be provided by either the press or die.

Figure 4:
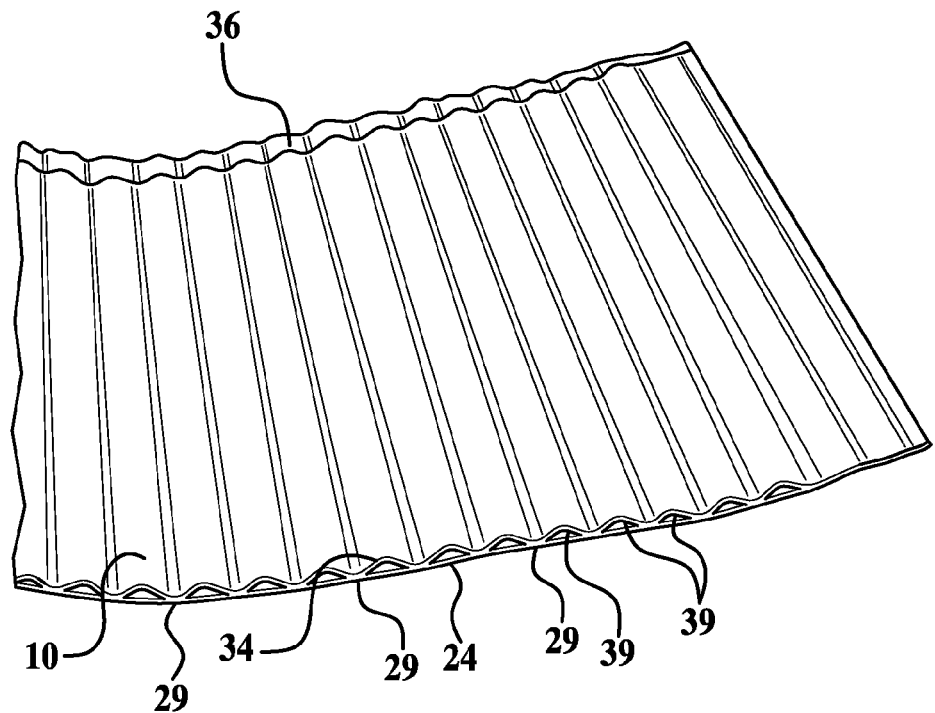
FIGS. 4-6 are perspective views of a portion of a filter constructed in accordance with one exemplary embodiment of the present invention.

In one exemplary embodiment, and as illustrated in FIG. 4 a sheet 37 of filtration media comprising layer 10 and layer 24 is formed. In one exemplary embodiment, the sheet of filtration media 32 is cut into a plurality of sheets 37 each of which are secured to each other to form a filter or filtration media for use in a housing. In addition, and as one sheet is stacked onto another sheet two sets of fluid flow paths 39 and 41 are formed. The fluid paths 39 are formed between layers 10 and 24 of each sheet, which are formed by the processes described above and herein (e.g., the channels formed in layer 10 and then as layer 24 is secured thereto). In accordance with an exemplary embodiment, fluid flow paths 41 are formed as each sheet 37 is secured to each other. In an exemplary embodiment fluid flow paths 41 are formed by the valleys formed in an upper surface 40 of first layer 10 thereafter the flow path 41 is formed, as a second layer 24 of another sheet is stacked upon upper surface 40. Although flow paths 41 are only shown on the upper most layer of the filter in FIG. 6 it is understood that flow paths 41 exist between each layer 24 and each upper surface 40 of each layer 10.

Figure 5:
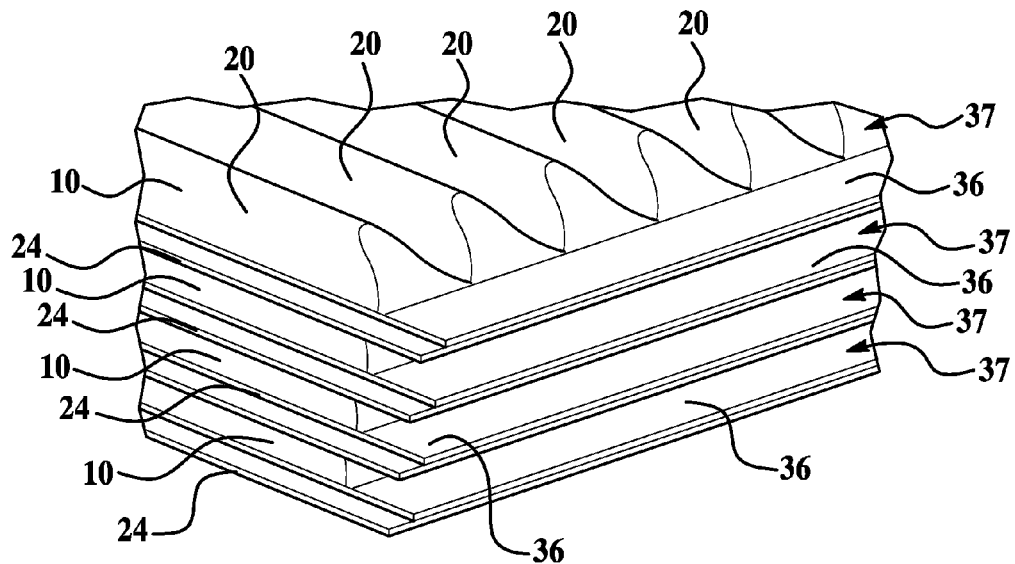
Figure 6:
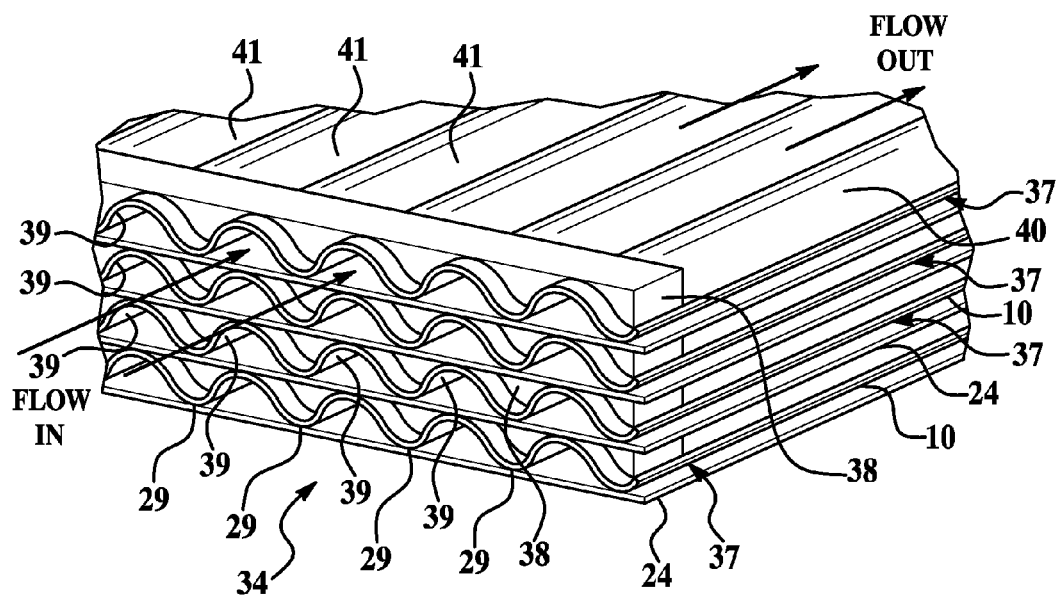

Referring now to FIGS. 5 and 6 and in order to form the final configuration of a filter constructed in accordance with an exemplary embodiment of the present invention, a strip of adhesive 38 is applied to upper surface 40 of first layer 10 after the same has been secured to second layer 24 to form sheet 37. Thereafter, another sheet is positioned on top so that a second layer 24 of one sheet is secured to a first layer 10 of another sheet. In other words each layer 10 will be secured to a layer 24 on opposite sides, one by sonic welding and one by adhesive. Adhesive 38 is positioned at an inlet end of the filter so that fluid flowing through the filter must first flow into fluid flow paths 39 and then through the filtration media of the first and/or second layer and into fluid flow path 41 so that the filtered fluid may pass through the exit end of the filter. As illustrated, FIG. 6 shows a portion of the inlet end of the filter and FIG. 5 shows a portion of the exit end of the filter.

In this embodiment, the filter is constructed from a plurality of sheets comprising layer 10 and layer 24 secured thereto. Accordingly, adhesive 38 is disposed on upper surface 40 of layer 10 of each of the sheets to secure the same to another sheet or more specifically, the second layer 24 of another sheet. A non-limiting example of adhesive 38 is a rubber and epoxy sealant or any other equivalent adhesive capable of securing the layers together as well as providing a fluid barrier. Although a strip of adhesive is shown it is, of course, understood that the adhesive may comprise any configuration as long as the same provides a fluid barrier. It is also understood that the adhesive be positioned at the entrance end of the filter so that the maximum amount of the filter is used for filtering of a fluid passing therethrough. In other words, if the sealant is disposed across the entire upper surface or closer to the exit end of the filter or sheet the fluid paths between the layers of each sheet will not be provided or the available surface filter area will be limited.

As illustrated in FIG. 6, the arrows in FIG. 6 illustrate the flow of air being filtered, as can be seen, the media comprising the entire length of the channels is used for filtration thus a larger amount of surface area is provided. In accordance with an exemplary embodiment and since sealant 38 is disposed at the inlet end of the filter, the entire length of the channels is used for filtration wherein either the media of sheet 10 or sheet 24 is the filtration barrier or media. Accordingly, each channel is used to provide a filtration surface area. Moreover, the direction of fluid flow through the filter is substantially changed or redirected since the fluid must traverse from one of the channels to another channel disposed between the two layers, which causes particulates entrained in the fluid stream to drop off or be captured in the channels of the filter.

In yet another alternative exemplary embodiment, sheets 37 may be stacked in an alternating arrangement wherein the sealed ends and open ends are alternated at each end of the filter and the sealant is disposed therebetween.

Figure 7:
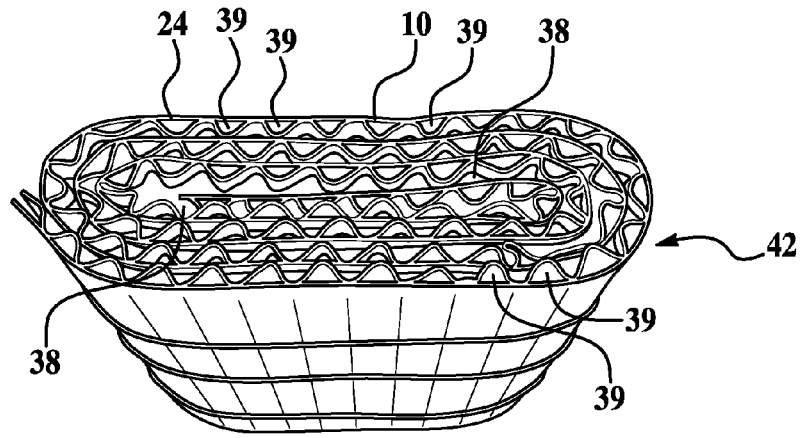
FIGS. 7-9 are views illustrating a filter constructed in accordance with another exemplary embodiment of the present invention.
Figure 8:
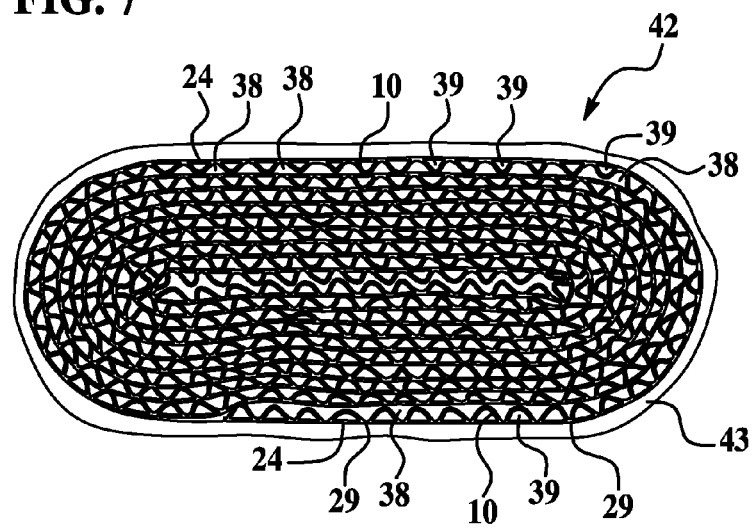
Figure 9:
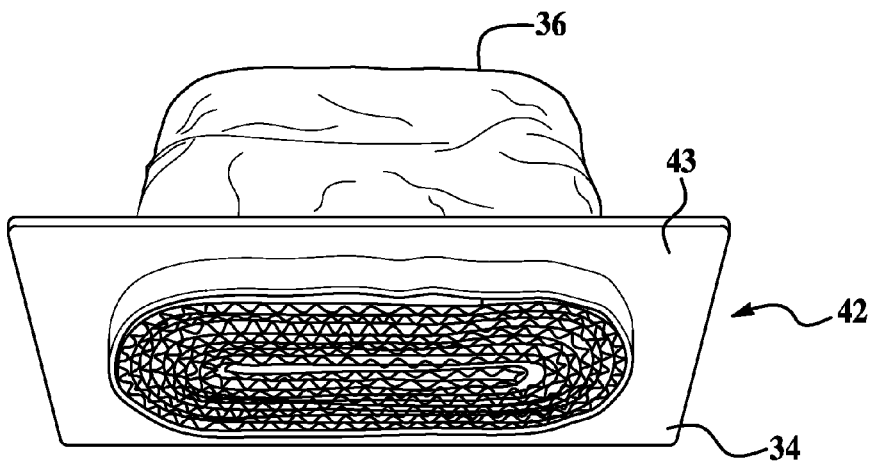
Figure 10:
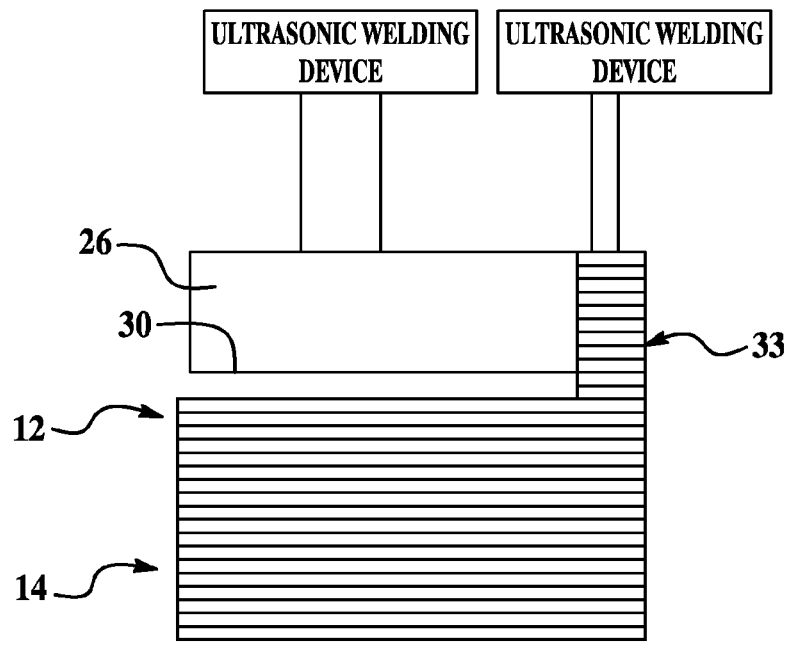
FIG. 10 illustrates portions of a roller mechanism and ultrasonic welding mechanism used in an exemplary embodiment of the present invention.
Figure 11:
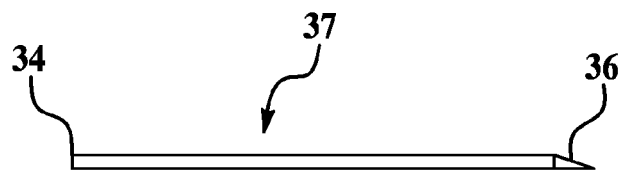
FIG. 11 is a side view of a sheet of media formed by the mechanism of FIG. 10.

Referring now to FIGS. 7-9 another alternative exemplary embodiment is illustrated. In this embodiment, a single continuous sheet is used to form the filter. In this exemplary embodiment, and as illustrated in FIGS. 1-3 the sheet of filtration media comprising layer 10 and layer 24 is formed via the forming process wherein a thermoforming process is used to form corrugations in layer 10 and thereafter layer 24 is secured thereto via a first ultrasonic horn to form the channels between the two layers and then a peripheral edge of the two sheets is sealed via a second ultrasonic horn to provide a sealed end of the layer of filtration media. Thereafter, a strip of adhesive 38 is disposed on the upper surface 40 of layer 10 along the inlet end 34 or non-sealed end of the sheet of the filtration media.

Then, the sheet is wrapped around itself so that adhesive 38 secures a portion of layer 24 to a portion of the upper surface of layer 10. As the sheet is wrapped around itself and secured together the two sets of fluid flow paths 39 and 41 are formed. Although not specifically shown in the Figures it is understood that paths 41 are located behind the sealant or adhesive 38 between each sheet 37. The fluid paths 39 are formed between layers 10 and 24 of each sheet, which are formed by the processes described above and herein while fluid flow paths 41 are formed as each portion of the sheet is secured together. In an exemplary embodiment fluid flow paths 41 are formed by the valleys formed in the upper surface 40 of first layer 10 thereafter the flow path 41 is formed as a portion of second layer 24 is wrapped around and secured to the upper surface. In accordance with an exemplary embodiment, adhesive 38 is positioned at an inlet end of the filter so that fluid flowing through the filter must first flow into fluid flow paths 39 and then through the filtration media of the first and/or second layer into fluid flow path 41 so that the filtered fluid may pass through the exit end of the filter.

In this embodiment, the filter is constructed from a single sheet comprising layer 10 and layer 24 secured thereto. Thereafter, the sheet of filter media is wrapped around itself such that second layer 24 is adhered to the adhesive disposed upon the upper surface of the first layer.

In another alternative exemplary embodiment, the filter is formed from a sheet 32 wrapped around and sealed to itself and thereafter another sheet or a plurality of sheets are secured to the wrapped portion in accordance with the teachings of FIGS. 5 and 6. Accordingly, and in this embodiment the adhesive 38 is disposed on upper surface 40 of layer 10 of the sheet wrapped around itself as well as each of the sheets secured to the wrapped sheet or another sheet ultimately secured to the wrapped sheet. A non-limiting example of adhesive 38 is a rubber and epoxy sealant or any other equivalent adhesive capable of securing the layers together as well as providing a fluid barrier. Although a strip of adhesive is shown it is, of course, understood that the adhesive may comprise any configuration as long as the same provides a fluid barrier. It is also understood that the adhesive be positioned at the entrance end of the filter so that the maximum amount of the filter is used for filtering of a fluid passing therethrough. In other words, if the sealant is disposed across the entire upper surface or closer to the exit end of the filter or sheet the fluid paths between the layers of each sheet will not be provided.

FIGS. 7-9 illustrate a filter 42 formed by wrapping and securing filter media 32 upon itself In accordance with an exemplary embodiment, each filter 42 will be formed from a sheet of filter media 32, which is in turn formed by securing two layers together and then wrapping media 32 upon itself and each filter will have a plurality of internal cavities extending therethrough until the sealed end 36, which improves the surface area of the filter. In an exemplary embodiment, the media wrapped around itself is inserted into a housing 43 having an opening for receiving the inlet end of the filter medium and an opening for an exit end of the filter medium. One non-limiting example of an application for housing 43 would be an air-filter housing for a vehicle or any other application requiring an air filter. Of course, exemplary embodiments of the present invention may be used in any type of filtering application for any type of fluid. In accordance with an exemplary embodiment the housing may have any configuration as long as an inlet opening and outlet opening is provided in order to facilitate flow through the inlet end and out the outlet end of the filter media. In other words, the housing illustrated in FIGS. 8 and 9 may comprise any alternative configuration.

As used herein, the term "filter" is intended to cover the wrapped, stacked or combination thereof of layers of the media to form an inlet end and an outlet end wherein the filtering of a fluid is facilitated by using the increased surface area of the formed media by flowing from the inlet end into the outlet end. Furthermore and as applications require and in alternative exemplary embodiments, the term "filter" is also intended to cover the aforementioned configurations of the media disposed in a housing having a corresponding inlet opening and a corresponding outlet opening wherein the filtering of a fluid is facilitated by using the increased surface area of the formed media by flowing from the inlet end into the outlet end and the formed media is constructed using any of the manufacturing process steps, methods, etc. disclosed herein.

As discussed, herein the media may comprise wrapped layer 32, a plurality of stacked sheets in one direction or an alternating direction or any combination thereof. Flow is facilitated through the media of the members by sealing the areas between the members at one end (e.g., sonic welding of end 36) and the adhesive being disposed between the layers of the filter as they are wrapped around themselves. Accordingly, fluid to be filtered will flow into the inlet ends of the filter and the filtered fluid will pass through the filter media at a location behind the sealant disposed at the inlet end of the filter.

Accordingly, and due to this unique configuration more surface filter area is provided without restricting flow since a plurality of cavities are provided.

As constructed, air or other fluid will flow into end 34 and then will be filtered by the media and exit through or proximate to the outlet end 36 of the filter after the air or fluid has been filtered. As shown, the inlet side comprises a plurality of inlet openings or a honeycomb style air filter wherein a high capacity is achieved through the maximization of the surface area of the filter media.

A prototype filter was constructed using media commercially available from Hollingsworth & Vose as BW3, a 3 oz/yd$^2$ polyester non-woven media. In addition, other non-woven medias from Hollingsworth & Vose were used including—BW4 4 oz., 7322 (high loft media) a 4 oz/yd yd$^2$ polyester non-woven media, with a slit or channel width of approximately 6 inches. The media was formed between two geared rollers, and heated just prior to entering the rolls. The media that passes through the forming rolls was guided to the top roll, and then passes between the top roll and a sonic weld horn, which welded along the length of each corrugation to secure the corrugated sheet to the flat sheet layer as well as provide the flat closed end portion. The finished corrugated-flat sheet combination was then rolled around itself and a rubber and epoxy seal was used to seal between the layers on the opposite end as that which contained the welded seam.

Figure 12:
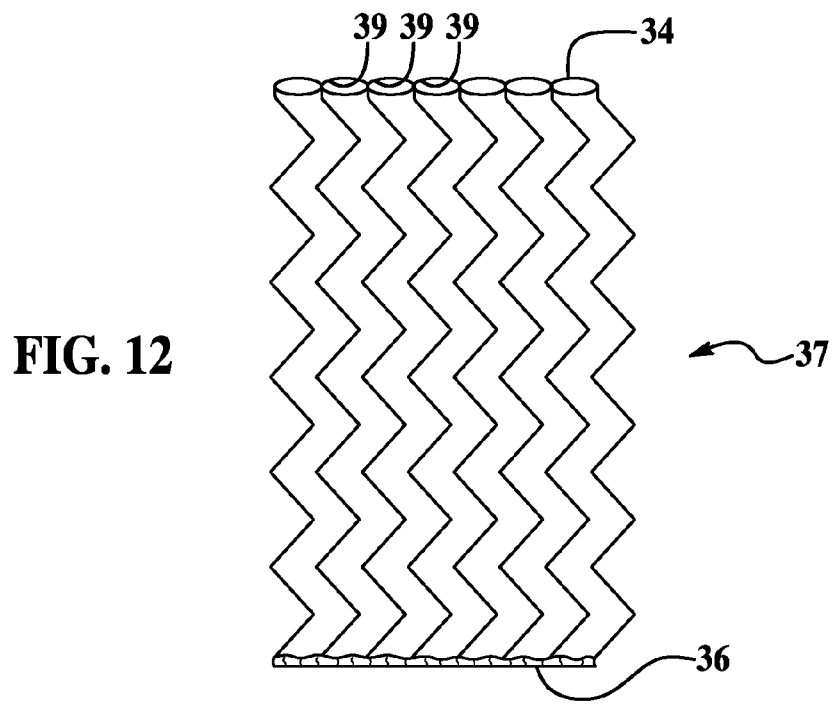
FIGS. 12-14 illustrate alternative exemplary embodiments of the present invention.
Figure 13:
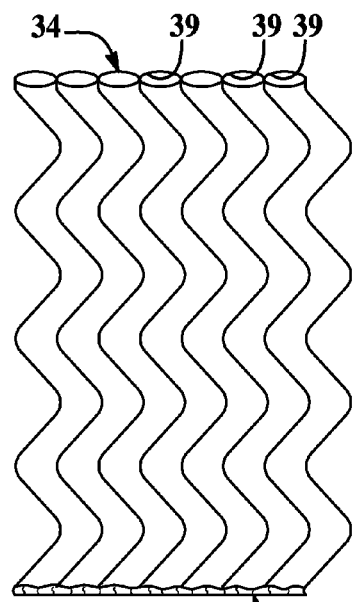
Figure 14:
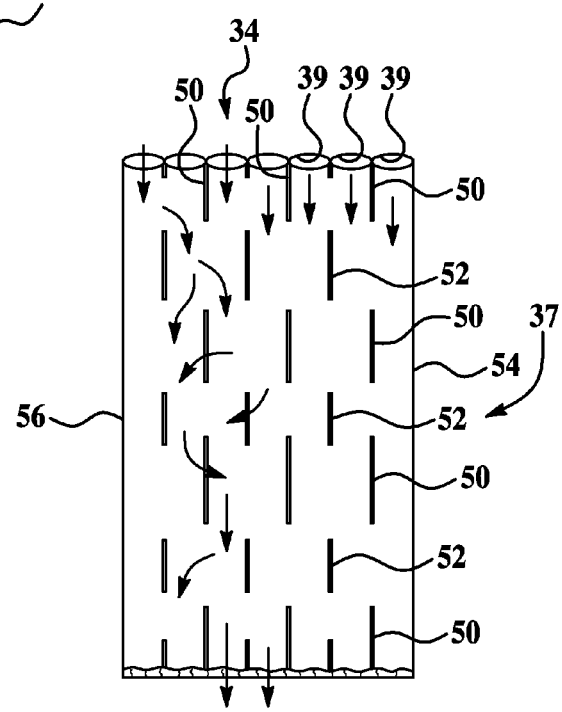

Referring now to FIGS. 12-14 alternative exemplary embodiments of the present invention are illustrated. Here alternative configurations of sheet 37 are illustrated. In accordance with exemplary embodiments of the present invention, sheets are formed using the processes and methods disclosed herein with varying patterns. For example, FIG. 12 illustrates a sheet 37 formed with a "herring bone" pattern, which in this embodiment would be formed by complimentary geared rollers 12 and 14 (e.g., having the herring bone configuration). As illustrated, sheet 37 has a closed peripheral edge 36 and an open edge 34, which has the open ends of the channels 39 extending through until the sealed edge 34. It being understood that the sealed and open ends of the sheet are formed by the methods disclosed herein (e.g., ultrasonic welding, adhesives, embossing and adhesives, and combinations thereof).

FIG. 13 illustrates a curved configuration, wherein sheet 37 is formed with curved channels or corrugations, which in this embodiment would be formed by complimentary geared rollers 12 and 14 (e.g., having the curved configuration). As illustrated, sheet 37 has a closed peripheral edge 36 and an open edge 34, which has the open ends of the channels 39 extending through until the sealed edge 34. It being understood that the sealed and open ends of the sheet are formed by the methods disclosed herein (e.g., ultrasonic welding, adhesives, embossing and adhesives, and combinations thereof).

FIG. 14 illustrates yet another configuration, wherein sheet 37 is formed with channels or corrugations only partially sealed therebetween. The channels or corrugations in this embodiment are again formed by complimentary geared rollers 12 and 14 however, the ultrasonic horn sealing the two layers together is configured to only make selective contact between the two layers. This may be achieved in one non-limiting embodiment by configuring the horn to have protrusions on the contact surface of the horn as well as moving the horn via an X-Y positioning device. As shown in FIG. 14 the horn is configured to make a first set of welds 50 having a first pattern and then make a second set of welds 52 having another or second pattern and thereafter the patterns are repeated. In this embodiment, the channels or corrugations between layers 10 and 24 are not completely sealed and fluid may flow as shown by the arrow in FIG. 14 however and in order to exit the filter media the fluid must pass through at least one layer 10 or 24. As illustrated, sheet 37 has a closed peripheral edge 36 and an open edge 34, which includes the open ends of the channels 39 extending through until the sealed edge 34. It being understood that the sealed and open ends of the sheet are formed by the methods disclosed herein (e.g., ultrasonic welding, adhesives, embossing and adhesives, and combinations thereof). In addition and in this embodiment, peripheral edges 54 and 56 must be completely sealed as opposed to the alternating patterns 50 and 52 defining channels or flow paths 39 extending therethrough.

Figure 15:
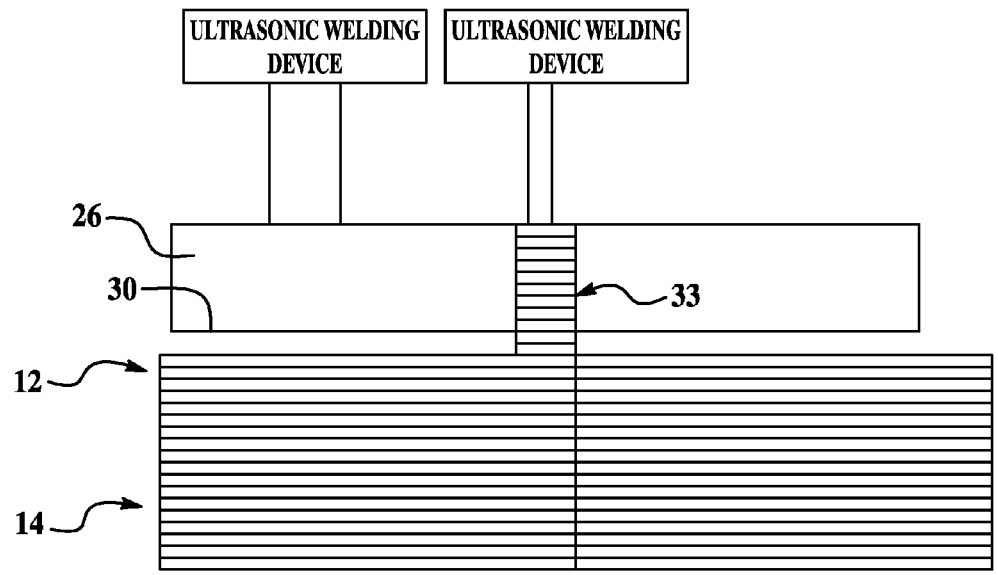
FIG. 15 illustrates portions of a roller mechanism and ultrasonic welding mechanism used in an alternative exemplary embodiment of the present invention.
Figure 16:
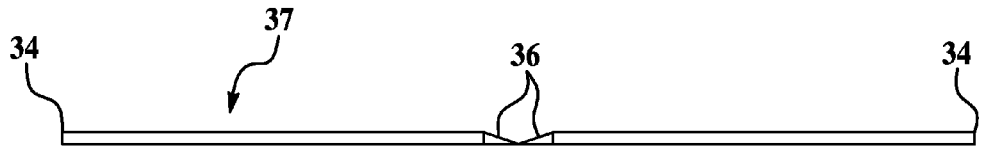
FIG. 16 is a side view of a sheet of media formed by the mechanism of FIG. 15.

Referring now to FIGS. 15 and 16 yet another alternative exemplary embodiment is illustrated. Here the ultrasonic horn 33 is positioned to place the sealed end in the middle of the sheet being thermoformed between rollers 12 and 14 as well as being sealed together by horn 26. Thereafter, the sheet is cut down the middle to provide the sheets illustrated in any of the aforementioned Figures.

Figure 17:
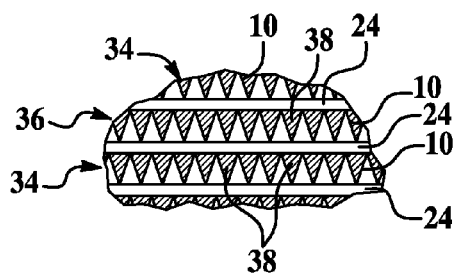
FIGS. 17 and 18 are end views of a filter media constructed in accordance with exemplary embodiments of the present invention.
Figure 18:
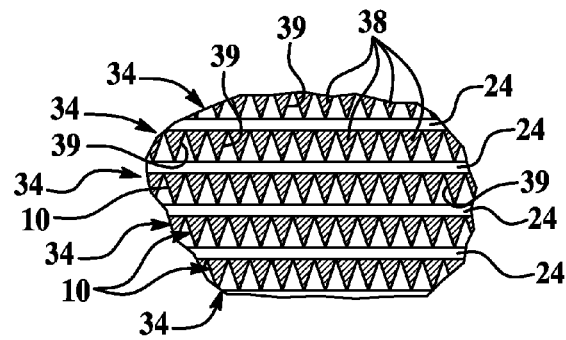

Referring now to FIGS. 17 and 18 end views of filters or configurations of filter media constructed in accordance with exemplary embodiment of the present invention are illustrated. Here the weld points between layers 10 and 24 are illustrated as well as the securement of layer 24 of one sheet via an adhesive to layer 10 of another sheet. In addition, the inlet end and the inlet ends or outlet ends of the filter are illustrated as well as the open ends of the fluid channels and the sealed ends of the fluid channels. Of course, the configurations illustrated in FIGS. 17 and 18 are provided as examples and exemplary embodiments are not intended to be limited to the specific configurations illustrated. FIG. 17 illustrates a stacked configuration of sheets 37 wherein the ends 34 and 36 are alternated here either end can be provided as an inlet end of the filter. FIG. 18 illustrates a stacked configuration of sheets 37 wherein the ends 34 provide the inlet end of the filter. Alternatively, ends 36 can provide the inlet end of the filter and ends 34 can provide the outlet end.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A filter, comprising:
a plurality of sheets of filter media, each sheet of filter media having an inlet end and an outlet end, wherein each of the plurality of sheets of filter media has a first layer of filtration media thermoformed to have a plurality of channels, the first layer having an upper surface and a lower surface;
a second layer of filtration media sonically welded to a portion of to the first layer of filtration media after the first layer is formed with the plurality of channels, wherein at least one edge of the first layer is not sonically welded to at least one edge of the second layer, and wherein the sheet of
filtration media has a plurality of fluid channels each having an inlet opening at the at least one edge of the first layer and the second layer and a sealed end at another end of the sheet;
wherein each of the plurality of sheets of filter media are secured together by a strip of adhesive located between each upper surface of each first layer facing the second layer of another sheet of filter media stacked upon the upper surface of the first layer of the filtration media; and
wherein each of the plurality of fluid channels are also in fluid communication with at least one other of the plurality of fluid channels through an opening located between the at least one edge of the first layer and the second layer and the sealed end.

2. The filter as in claim 1, wherein the first layer of filtration media and the second layer of filtration media are non-woven polyester materials and the sheets are secured to each other in an alternating arrangement.

3. The filter as in claim 1, wherein the filter is an air filter configured to be received in a housing.

4. The filter as in claim 1, wherein the strip of adhesive is a rubber and epoxy sealant disposed at the inlet end of the sheet of filter media, wherein the inlet openings are located at an inlet end of the filter.

5. The filter as in claim 1, wherein the plurality of channels are formed to have a curved or herringbone configuration.

6. The filter as in claim 1, wherein the thermoformed first layer of filtration media is formed by passing the first layer of filtration media between a pair of geared rollers each having a plurality of teeth configured to form the plurality of channels in the first layer of filtration media as it is passed between the pair of geared rollers and wherein the first layer of filtration media is a polyester non-woven media.

7. The filter as in claim 6, wherein the first layer of filtration media is heated prior to it being inserted between the pair of geared rollers.

* * * * *